United States Patent
Tran et al.

(10) Patent No.: US 7,139,744 B2
(45) Date of Patent: Nov. 21, 2006

(54) REORGANIZING DATA IN LOG FILES FOR DATA TRACKING MANAGEMENT

(75) Inventors: Trung M. Tran, Round Rock, TX (US); Sze Tom, Austin, TX (US); Alan C. Folta, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 431 days.

(21) Appl. No.: 10/255,900

(22) Filed: Sep. 25, 2002

(65) Prior Publication Data
US 2004/0059707 A1   Mar. 25, 2004

(51) Int. Cl.
*G06F 7/00*   (2006.01)
(52) U.S. Cl. .......................................... 707/1; 707/100
(58) Field of Classification Search .................... 707/1, 707/200, 202; 395/618, 617, 650
See application file for complete search history.

(56) References Cited

U.S. PATENT DOCUMENTS 5,774,716 A * 6/1998 Harbinski et al. .......... 707/202
2004/0015469 A1* 1/2004 Beier et al. ..................... 707/1

* cited by examiner

*Primary Examiner*—Charles Rones
*Assistant Examiner*—Belix M. Ortiz
(74) *Attorney, Agent, or Firm*—Blakely, Sokoloff, Taylor & Zafman LLP

(57) ABSTRACT

Disclosed are novel methods and apparatus for reorganizing data in a log file. In an embodiment, a method of reorganizing data in an original log file is disclosed. The method includes: obtaining a data record from the original log file; examining the data record; if the data record includes a single-value entry, inserting the data record in a single-value storage linked list; if the data record includes a multiple-values entry, inserting the data record in a multiple-values linked list; and utilizing data from the multiple-values and single-value linked lists to write data to a new log file.

20 Claims, 4 Drawing Sheets

402 — Abstract: Fixing the current time stamp

404 — Number: 02250227

406 — Opened by: tmtran

408 — Opened against: Timing    Owned by: unknown    410

412 {
- Status: Open         Changed on: Mon Feb 25 14:39:38 CST 2000
- Status: Investigate  Changed on: Wed Feb 27 10:39:38 CST 2002    418
- Status: Working      Changed on: unknown
- Status: Verify       Changed on: unknown
}

414 {
- Priority: Low      Changed on: Mon Feb 25 14:39:38 CST 2002
- Priority: High     Changed on: Wed Feb 27 10:39:38 CST 2002
- Priority: Highest  Changed on: Web Feb 27 17:30:31 CST 2002    420
- Priority: Low      Changed on: Fri Feb 29 14:09:08 CST 2002
}

416 {
- Assigned to: unknown  Assigned on: Mon Feb 25 14:49:38 CST 2002
- Assigned to: tmtran   Assigned on: Wed Feb 27 10:39:38 CST 2002
- Assigned to: stom     Assigned on: Wed Feb 27 17:30:31 CST 2002    422
- Assigned to: afolta   Assigned on: Fri Feb 29 14:09:08 CST 2002
}

*Fig. 4*

REORGANIZING DATA IN LOG FILES FOR DATA TRACKING MANAGEMENT

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software and data as described below and in the drawings hereto: Copyright © 2002, Sun Microsystems, Inc., All Rights Reserved.

FIELD OF INVENTION

The present invention generally relates to the field of managing data tracking. More specifically, an embodiment of the present invention provides a method of reorganizing data in log files for data tracking management.

BACKGROUND OF INVENTION

As integrated circuit (IC) fabrication technology improves, manufacturers are able to integrate additional functionality onto a single silicon substrate. As the number of these functions increases, however, so does the complexity of the designs, and potential defects associated therewith. Often to meet deadlines, many designers work on a same design simultaneously. The partial designs will then need to be put together to make a final product. The timing is of the essence in making sure that the many portions of the design are finished relatively simultaneously and free of defects. In addition, it is imperative that strict deadlines are followed, in part, because a later design stage may depend on information regarding a preceding stage before meaningful design may be commenced.

FIG. 1 illustrates an exemplarily flow diagram of a typical design process 100 for ICs in accordance with the prior art. The process can be generally divided into a front end design phase and a back end development phase. During the front end phase, an engineer designs and develops a logical representation of an IC from a set of specifications in form of a schematic (stage 102). At a stage 104, the schematic is then loaded into a computer from which a circuit netlist is generated. The netlist defines the entire IC design including all components and interconnections.

Moreover, the IC information may be developed using hardware description language (HDL) and synthesis. With the aid of circuit simulation tools available on computers, a designer can then simulate the functionality of a given circuit at a stage 106. The circuit simulation process may involve several iterations of design modifications and improvements, until the circuit design is finalized at a stage 108.

The back end development involves several stages during which a final circuit layout (physical description) is developed based on the schematic design of the front end. In a stage 110, various building blocks (or cells), as defined by the finalized circuit schematic, are placed within a pre-defined floor plan. For ICs designed based on array or standard cell technology, the various building circuit blocks are typically pre-defined and made available in a cell library. For example, during the stage 110, a plurality of cells are selected from one or more cell libraries and the cell interconnects are determined. More particularly, groups of cells may be interconnected to function as a flip-flop, shift registers, and the like. The routing of wires to interconnect the cells and achieve the aforementioned goals is preformed during a routing stage 112, typically referred to as conducting paths, wires or nets. Accordingly, in the stage 112, interconnects between circuit elements are routed throughout the layout. In a stage 114, the accuracy of the layout is verified against the schematic and if no errors or design rule violations are found at a stage 116, the circuit layout information is used for the process of fabrication in a stage 118.

Accordingly, layout tracking and verification and/or defect tracking of discovered problems are important parts of manufacturing an IC. These tasks may be partially automated by using a software application. In many software applications where the important data is recorded and appended to the end of a file constantly, a meaningful reordering and reorganizing of the data in that file can be a cumbersome task. For example, for a layout tracking tool, layout designers may update a layout chart periodically and a layout manager needs to sort out the layout chart information to keep track of scheduling. Furthermore, in a defect tracking tool example, interested parties need to open the defect log file, read the file from the beginning to the end repeatedly, analyze the records, and sort them so as to understand and follow the defect cycle (who opened, when it was assigned, when it was accepted, when it was fixed, when it was closed, etc.).

In both of these examples, opening the log file(s), analyzing the records, and reordering them can be a time-consuming task prone to many errors. A software application may be utilized to perform such tasks by, for example, opening the current log file for read and a temp file for write, getting the data from log file one portion at a time, organizing the data, writing the organized data to the temp file, closing the log file, and writing the temp file over the log file. However, one or more of the following drawbacks still remain: (1) IO: read from the top to the bottom of the log file repeatedly; (2) Performance: opening and closing files; and/or (3) Human Error: analyzing and recording the appropriate data.

SUMMARY OF INVENTION

The present invention, which may be implemented utilizing a general-purpose digital computer, in various embodiments, includes novel methods and apparatus to reorganize data in a log file. In an embodiment, a method of reorganizing data in an original log file is disclosed. The method includes: obtaining a data record from the original log file; examining the data record; if the data record includes a single-value entry, inserting the data record in a single-value storage linked list; if the data record includes a multiple-values entry, inserting the data record in a multiple-values linked list; and utilizing data from the multiple-values and single-value linked lists to write data to a new log file.

In another embodiment, the new log file includes a reorganized version of the data from the original log file.

In a further embodiment, the method may further include inserting a time stamp into the multiple-values linked list if the data record includes the multiple-values entry.

In yet another embodiment, the method may further include inserting a time stamp into the single-value linked list if the data record includes the single-value entry.

BRIEF DESCRIPTION OF DRAWINGS

The present invention may be better understood and its numerous objects, features, and advantages made apparent to those skilled in the art by reference to the accompanying drawings in which:

FIG. 4 illustrates an exemplarily report 400 in accordance with an embodiment of the present invention.

The use of the same reference symbols in different drawings indicates similar or identical items.

DETAILED DESCRIPTION

In the following description, numerous details are set forth. It will be apparent, however, to one skilled in the art that embodiments of the invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

In addition, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, optical disks, compact disc-read only memories (CD-ROMs), and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data.

Additionally, embodiments of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Figure 1:
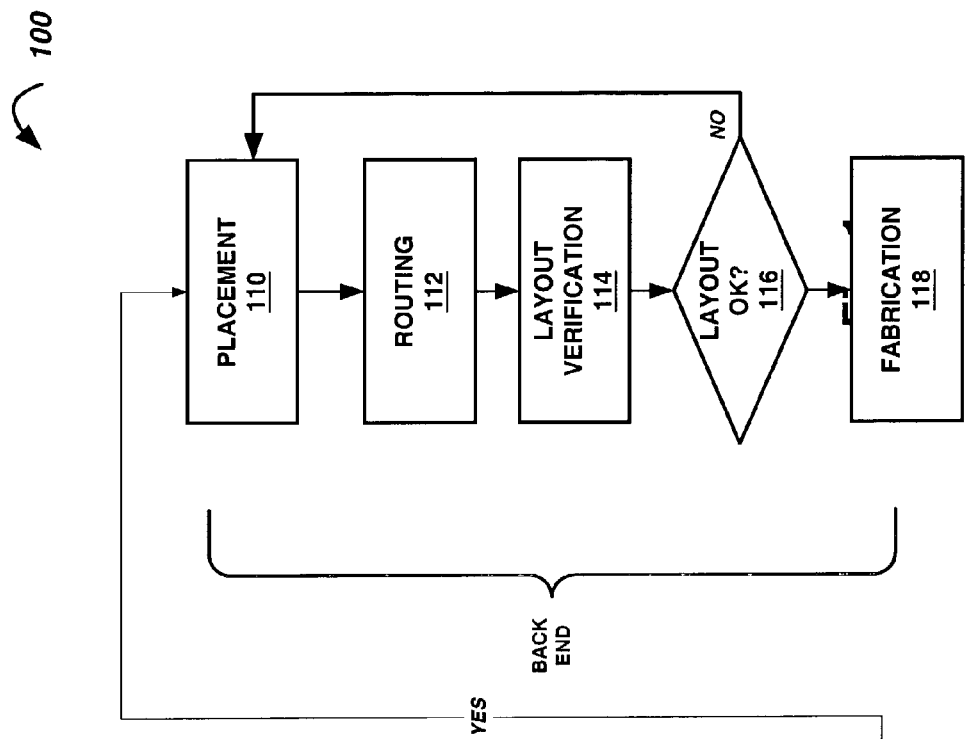
FIG. 1 illustrates an exemplarily flow diagram of a typical design process 100 for ICs in accordance with the prior art.
Figure 1:
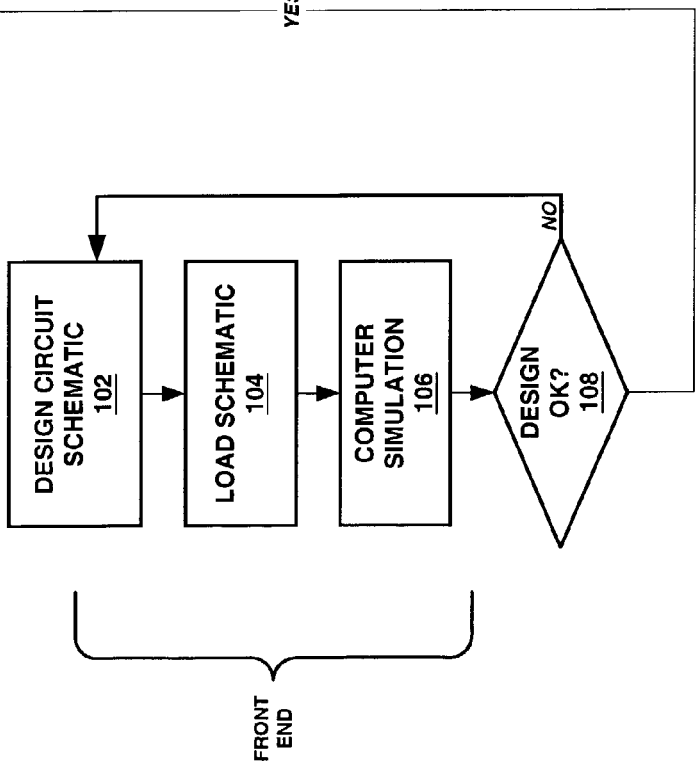
Figure 2:
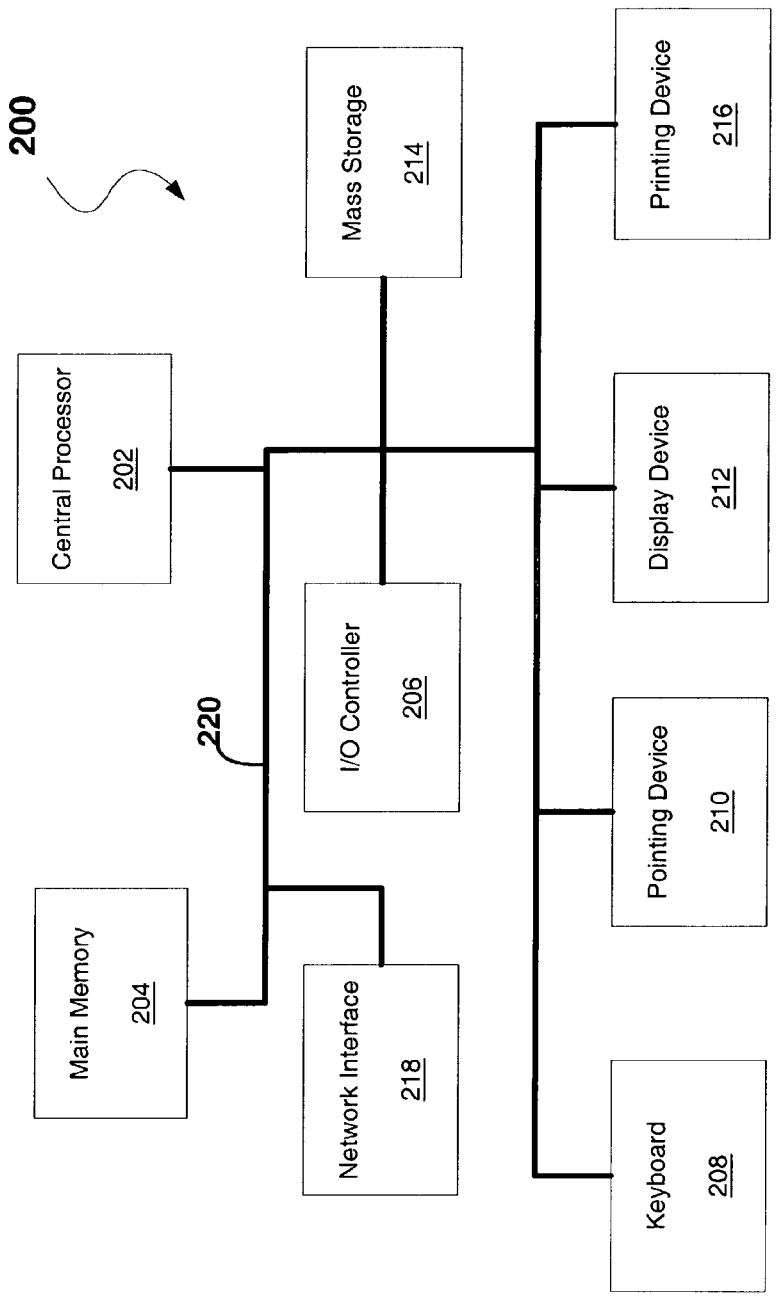
FIG. 2 illustrates an exemplary computer system 200 in which the present invention may be embodied.

FIG. 2 illustrates an exemplary computer system 200 in which the present invention may be embodied in certain embodiments. The system 200 comprises a central processor 202, a main memory 204, an input/output (I/O) controller 206, a keyboard 208, a pointing device 210 (e.g., mouse, track ball, pen device, or the like), a display device 212 a mass storage 214 (e.g., a nonvolatile storage such as a hard disk, an optical drive, and the like), and a network interface 218. Additional input/output devices, such as a printing device 216, may be included in the system 200 as desired. As illustrated, the various components of the system 200 communicate through a system bus 220 or similar architecture.

In an embodiment, the computer system 200 includes a Sun Microsystems computer utilizing a SPARC microprocessor available from several vendors (including Sun Microsystems of Santa Clara, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.). In addition, instead of a single processor, two or more processors (whether on a single chip or on separate chips) can be utilized to provide speedup in operations. It is further envisioned that the processor 202 may be a complex instruction set computer (CISC) microprocessor, a reduced instruction set computing (RISC) microprocessor, a very long instruction word (VLIW) microprocessor, a processor implementing a combination of instruction sets, and the like.

The network interface 218 provides communication capability with other computer systems on a same local network, on a different network connected via modems and the like to the present network, or to other computers across the Internet. In various embodiments, the network interface 218 can be implemented utilizing technologies including, but not limited to, Ethernet, Fast Ethernet, wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, time division multiplexing (TDM), universal serial bus (USB and its varieties such as USB II), asynchronous transfer mode (ATM), satellite, cable modem, and/or FireWire.

Moreover, the computer system 200 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), and the like. Also, it is envisioned that in certain embodiments, the computer system 200 is a general purpose computer capable of running any number of applications such as those available from companies including Oracle, Siebel, Unisys, Microsoft, and the like.

Figure 3:
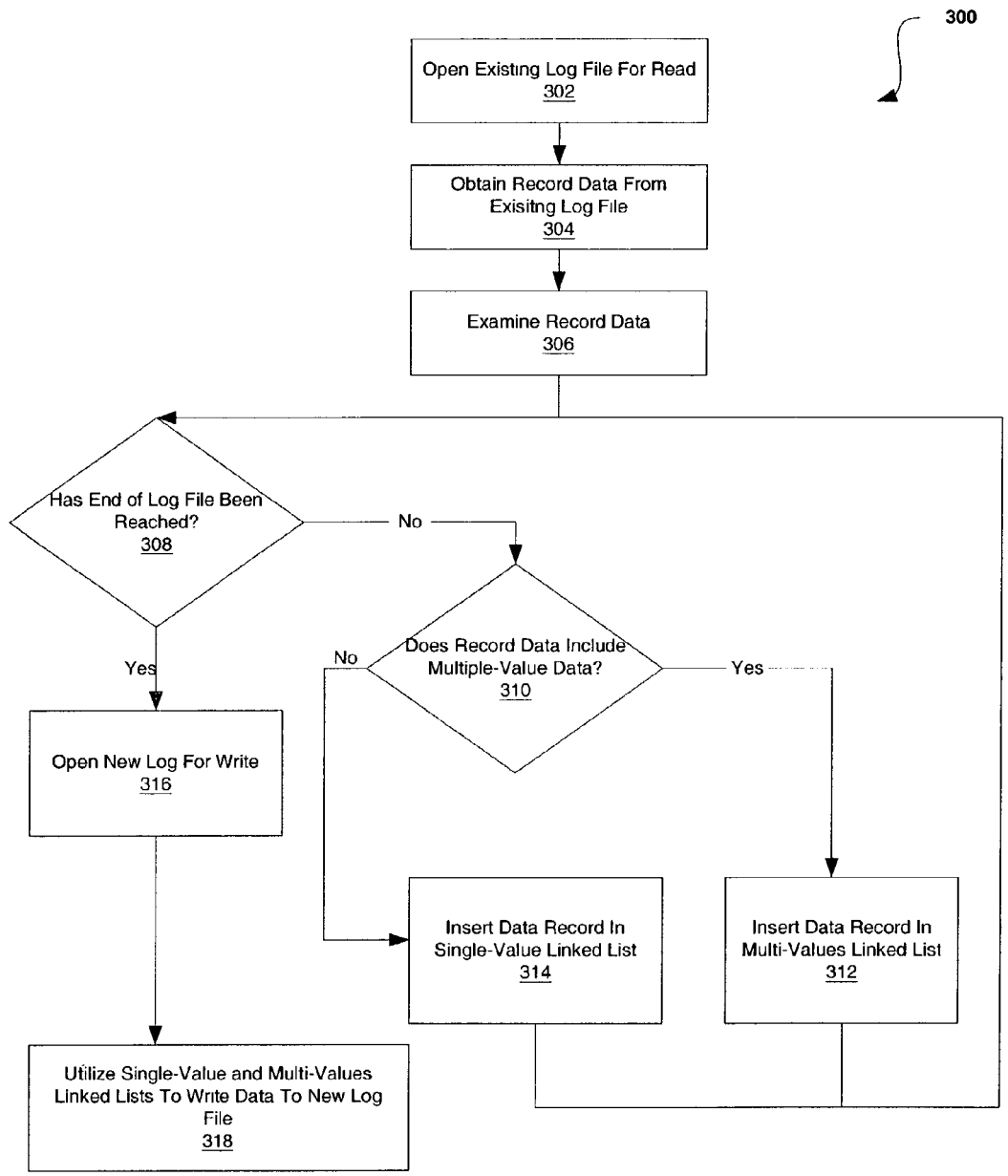
FIG. 3 illustrates an exemplarily method 300 in accordance with an embodiment of the present invention.

FIG. 3 illustrates an exemplarily method 300 in accordance with an embodiment of the present invention. In a stage 302, an existing log file is opened for read operations. A stage 304 obtains record data from the existing log file (e.g., which was opened in the stage 302). A stage 306 examines the record data (e.g., obtained in the stage 304). In a stage 308, it is determined whether the end of the log file opened in the stage 302 has been reached. If the stage 308 determines that the end of the file has not been reached, a stage 310 determines whether the record data (e.g., examined by the stage 306) includes multiple-value data. If the stage 310 determines that the record data includes multiple-value data, a stage 312 inserts the data record in a multi-values linked list.

The method 300 resumes its operations at the stage 308 once it is done with the stage 312. Alternatively, if the stage 310 determines that the record data does not include multiple value data, a stage 314 inserts the data record in a single-value linked list. The method 300 resumes at the stage 308 after the stage 314 is reached. If the stage 308 determines that the end of the log file has been reached, a stage 316 opens a new log file for write operations. A stage 318 utilizes the single-value and multi-values linked lists to write data to the new log file. In one embodiment, the stage 318 can write data to the new log file in an order including, but not limited to, chronologically, alphabetically, and the like. In further embodiments, the stage 318 may write the data to another linked list in addition to, or instead of, writing to the new log file. It is envisioned that in an embodiment the stages 312 and 314 may additionally insert the date and/or time when the data record is inserted.

Accordingly, in an embodiment where the log file contains data for multiple users, a linked list for the users may be used. In case of data records for a particular instance, for example, a particular defect or a particular user, a linked list may not be required to keep track of all the log files. A structure may be sufficient to achieve such goals. However, in implantations where the log file contains data from multiple users, a linked list implementation may be significantly beneficial.

Additionally, such a data structure may only contain the members which have the multiple values. In an embodiment, each member may have a linked list. For example, in a defect tracking tool, component name, priority, abstract, "assigned to" may have multiple values whereas defect number and "opened by" may have only one value. With respect to a layout log example, date for running some jobs such as PDV, LVS, and alike may have multiple-value data whereas layout designer or cell name may only have single value-data. In a further embodiment, for each multiple-value data, there may be a linked list to link the data together. Accordingly, each time a new data record which contains multiple-value data is detected from, for example, reading a log file, its value may be inserted onto its respective linked list along with the date, for example. Similarly, every time a new data record which contains single-value data is detected, that record may be inserted into the single-value linked list. Having used two linked lists, one can manipulate both the multiple-value data and the single-value data more easily. An example of the structure and link list for a defect tracking tool is provided in C-like language below.

```
struct single_value {
    int         defect;
    char        *reportedby;
    char        *openedagainst;
    char        *ownedby;
};
struct multi_value {
    COMP        *comp;
    PRI         *pri;
    ABS         *abs;
    ASSIGNTO    *assignto;
};
struct STATUS {
    char        *ts;
    char        *st;
    struct STATUS *next;
};
struct COMP {
    char        *ts;
    char        *name;
    structCOMP  *next;
};
struct PRI {
    char        *ts;
    char        *p;
    struct PRI  *next;
};
struct ABS {
    char        *ts;
    char        *str;
    struct ABS  *next;
};
struct ASSIGNTO {
    char        *ts;
    char        *user;
    struct ASSIGNTO *next;
};
```

In the above-exemplified data structures, ASSIGNTO, ABS, PRI, STATUS, and COMP are implemented as linked lists. As shown, ASSIGNTO may indicate the person and time of when a defect has been assigned. ABS may indicate the time and text of the abstract of the defect. PRI may indicate the time and priority of the defect. STATUS may indicate the time and status of the defect resolution. And, COMP may indicate the time and name of the component with the defect.

As illustrated in the above structures, for a single-value structure, four fields may be defined. Namely, "defect" indicates the defect number (e.g., as an integer); "reportedby" indicates the name of the person reporting the defect (e.g., as a text or set of characters); "openedagainst" indicates which category encompasses the defect (e.g., as a text or set of characters); and "ownedby" indicates the person responsible for dealing with the defect (e.g., as a text or set of characters). In an embodiment, the category may be the name of a project. Moreover, the multi-value structure includes four fields (i.e., ASSIGNTO, ABS, PRI, and COMP as discussed above).

FIG. 4 illustrates an exemplarily report 400 in accordance with an embodiment of the present invention. The report 400 may be provided as a result of applying the method 300 of FIG. 3. The report 400 includes an abstract field 402 with, for example, a sample description of the defect being addressed. The report 400 also includes a field 404 which may include a unique number to view the respective problem being solved (e.g., as abstracted by the field 402). The report 400 may further include a field for identifying the user who has opened the defect request (406), associated with the report 400. A field 408 may include information about what item and/or problem the present report is opened against (408). The report 400 may also include a field identifying the user who owns the problem (410). The report 400 may further include one or more sections, for example for identifying the status of the problem or defect tracking (412), a priority section 414 for identifying the assigned priority to the present problem and a section 416 for indicating who the problem is assigned to. Each of the sections 412, 414, and 416 may include time stamp information (418, 420, and 422 respectively).

In an embodiment, the abstract field 402 may include information such as project, component, defect number, abstract, status, priority and alike. As illustrated in FIG. 4, the message log field 408 may include log information regarding defects and/or changes made there to. The report 400 may further include fields and/or sections for the component at issue (not shown).

In an embodiment, it is envisioned that advantages of employing a linked list configuration include reduction of limitations on the number of entries, temporary storage of data without having to open and save a file repeatedly, providing a non-fragmented file, and/or utilization of system resources such as an exception handler provided in, for example, Solaris systems by Sun Microsystems, which would save any unrecorded data prior to an involuntary termination of a program.

The foregoing description has been directed to specific embodiments. It will be apparent to those with ordinary skill in the art that modifications may be made to the described embodiments, with the attainment of all or some of the advantages. For example, the techniques of the present invention may be applied to any type of tracking management system (including, but not limited to, defect and/or layout tracking). Additionally, even though certain embodiments of the present invention have been discussed with respect to log files, other types of files may also be utilized without departing from the spirit of the present invention. Therefore, it is the object of the appended claims to cover all such variations and modifications as come within the spirit and scope of the invention.

What is claimed is:

1. A computer-implemented method of reorganizing data in an original log file, the method comprising:
    obtaining a data record from the original log file;
    examining the data record;
    inserting single-value entries of the data record in a single-value storage linked list, wherein the single-value storage linked list is a data structure including the values of each of the single-value entries of the data record;
    inserting multiple-value entries of the data record in a multiple-values linked list, wherein the multiple-value linked list is a data structure including linked list data structures for each of the multiple-value entries of the data record, the linked list data structure including a value of its corresponding multiple-value entry and a pointer to a next value of the multiple-value entry; and
    utilizing data from the multiple-values and single-value linked lists to write data to a new log file,
    wherein the new log file includes a reorganized version of the data from the original log file.

2. The method of claim 1 further including inserting a time stamp into the multiple-values linked list if the data record includes the multiple-values entry.

3. The method of claim 1 further including inserting a time stamp into the single-value linked list if the data record includes the single-value entry.

4. The method of claim 1 wherein the single-value linked list includes at least one field selected from a group consisting of a number, a reporting person, a category, and a responsible person.

5. The method of claim 1 wherein the multiple-values linked list includes at least one field selected from a group consisting of priority, abstract, assigned person, and component name.

6. The method of claim 1 wherein the data record relates to layout tracking.

7. The method of claim 1 wherein the data record relates to defect tracking.

8. An article of manufacture for reorganizing data in an original log file, the article comprising:
    a machine readable medium that provides instructions that, when executed by a machine, will cause the machine to perform operations including:
        obtaining a data record from the original log file;
        examining the data record;
        inserting single-value entries of the data record in a single-value storage linked list, wherein the single-value storage linked list is a data structure including the values of each of the single-value entries of the data record;
        inserting multiple-value entries of the data record in a multiple-values linked list, wherein the multiple-value linked list is a data structure including linked list data structures for each of the multiple-value entries of the data record, the linked list data structure including a value of its corresponding multiple-value entry and a pointer to a next value of the multiple-value entry; and
        utilizing data from the multiple-values and single-value linked lists to write data to a new log file,
        wherein the new log file includes a reorganized version of the data from the original log file.

9. The article of claim 8 wherein the single-value linked list includes at least one field selected from a group consisting of a number, a reporting person, a category, and a responsible person.

10. The article of claim 8 wherein the multiple-values linked list includes at least one field selected from a group consisting of priority, abstract, assigned person, and component name.

11. The article of claim 8 wherein the data record relates to layout tracking.

12. The article of claim 8 wherein the data record relates to defect tracking.

13. The article of claim 8 wherein the operations further include inserting a time stamp into the multiple-values linked list if the data record includes the multiple-values entry.

14. A computer-implemented system for reorganizing data in an original log file, the system comprising:
    a record puller to obtain a data record from the original log file;
    an examiner to examine the data record;
    a data record inserter to:
        insert single-value entries of the data record in a single-value storage linked list, wherein the single-value storage linked list is a data structure including the values of each of the single-value entries of the data record; and
        insert multiple-value entries of the data record in a multiple-values linked list, wherein the multiple-value linked list is a data structure including linked list data structures for each of the multiple-value entries of the data record, the linked list data structure including a value of its corresponding multiple-value entry and a pointer to a next value of the multiple-value entry; and
    a data recorder to write data to a new log file utilizing data from the multiple-values and single-value linked lists,
    wherein the new log file includes a reorganized version of the data from the original log file.

15. The system of claim 14 further including a time stamper to insert a time stamp into the multiple-values linked list if the data record includes the multiple-values entry.

16. The system of claim 14 further including a time stamper to insert a time stamp into the single-value linked list if the data record includes the single-value entry.

17. The system of claim 14 wherein the single-value linked list includes at least one field selected from a group consisting of a number, a reporting person, a category, and a responsible person.

18. The system of claim 14 wherein the multiple-values linked list includes at least one field selected from a group consisting of priority, abstract, assigned person, and component name.

19. The system of claim 14 wherein the data record relates to layout tracking.

20. The system of claim 14 wherein the data record relates to defect tracking.

* * * * *